(12) United States Patent
Wong et al.

(10) Patent No.: US 8,499,156 B2
(45) Date of Patent: Jul. 30, 2013

(54) METHOD FOR IMPLEMENTING ENCRYPTION AND TRANSMISSION OF INFORMATION AND SYSTEM THEREOF

(75) Inventors: Shek Duncan Wong, Hong Kong (CN); Xiaokang Xiong, Hong Kong (CN)

(73) Assignee: City University of Hong Kong (CN)

( * ) Notice: Subject to any disclaimer, the term of this patent is extended or adjusted under 35 U.S.C. 154(b) by 219 days.

(21) Appl. No.: 13/000,805

(22) PCT Filed: May 20, 2009

(86) PCT No.: PCT/CN2009/000549
§ 371 (c)(1), (2), (4) Date: Feb. 24, 2011

(87) PCT Pub. No.: WO2009/155781
PCT Pub. Date: Dec. 30, 2009

(65) Prior Publication Data
US 2011/0154036 A1    Jun. 23, 2011

(30) Foreign Application Priority Data
Jun. 24, 2008 (CN) .......................... 2008 1 0128895

(51) Int. Cl.
*H04L 29/06* (2006.01)
(52) U.S. Cl.
USPC ........... 713/168; 713/169; 713/170; 713/171; 713/172; 713/173; 726/3; 726/4; 726/5; 726/6; 726/7
(58) Field of Classification Search
USPC ........................................................ 713/168
See application file for complete search history.

(56) References Cited

U.S. PATENT DOCUMENTS 6,058,193 A    5/2000    Cordery et al.
(Continued)

FOREIGN PATENT DOCUMENTS

CN    1968091 A    5/2007
CN    101166088 A1    4/2008

OTHER PUBLICATIONS

English Translation of International Search Report of PCT/CN2009/000549 dated Aug. 27, 2009.
English Translation of Written Opinion of the International Searching Authority of PCT/CN2009/000549 dated Aug. 19, 2009.

*Primary Examiner* — Longbit Chai
(74) *Attorney, Agent, or Firm* — Amster, Rothstein & Ebenstein LLP

(57) ABSTRACT

The invention discloses a method for implementing encryption and transmission of information and system thereof. The method comprises the following steps when a sender sends information to a receiver: a client of the sender encrypts the information by using a unique identifier of a receiver identity as a public key; the sender sends the encrypted information to the receiver; the receiver receives the encrypted information, and a client of the receiver performs decryption by using a user private key; wherein the client of the receiver obtains the user private key by one-off registration and the user private key matches with the unique identifier of the receiver identity. The system comprises an information transmission platform, a sender and a receiver connected to each other by the information transmission platform, clients provided in the sender and the receiver, and a registration component. According to the present invention, secure communication between the sender and the receiver is realized without a process of establishing any initial key, and the negotiation process between the sender and the receiver before encryption/decryption and the interactions with any other entities during every encryption/decryption procedure are avoided.

12 Claims, 4 Drawing Sheets

U.S. PATENT DOCUMENTS

| | | | |
|---|---|---|---|
| 6,424,718 B1 * | 7/2002 | Holloway | 380/277 |
| 2004/0098589 A1 * | 5/2004 | Appenzeller et al. | 713/170 |
| 2007/0124578 A1 | 5/2007 | Paya et al. | |
| 2007/0172066 A1 * | 7/2007 | Davin | 380/262 |

* cited by examiner

METHOD FOR IMPLEMENTING ENCRYPTION AND TRANSMISSION OF INFORMATION AND SYSTEM THEREOF

TECHNICAL FIELD

The present invention relates to mobile communication field, and more particularly, to a method for implementing encryption and transmission of information and a system thereof.

BACKGROUND

At present, some service providers exchange information with a mobile terminal of a user in the manner of MMS (Multimedia Message Service), SMS (Short Message Service), etc., so as to realize convenient and prompt service support and processing.

For example, a bank may provide double authentication services for a user by delivering a password in the manner of SMS or MMS to its ATM user or electronic banking user, so that the user can manage remotely account. Similarly, finance organizations and legal services organizations usually may also accomplish service processing by interaction with a terminal of a user.

Obviously, in the above situations, the information between the service provider and the mobile terminal needs to be protected confidentially. Or else, once the information is intercepted, it is very likely to cause significant loss in economic aspect or legal aspect. Even for the situation in which the information does not need to be protected confidentially, e.g., in the context of information exchange between mobile terminals, requirement of security still exists due to involving personal privacy.

To ensure information security, the information is generally encrypted with a key in the prior art, so as to avoid transmission of information in plaintext form. Key encryption technology mainly comprises the following two approaches.

One is symmetric key encryption (also referred to as secret key encryption or private key encryption), i.e., a sender and a receiver perform encryption and decryption algorithm to plaintext information using the same/symmetric key. It is required that, before sending or receiving encrypted information, a sender and a receiver not only have to perform key negotiation beforehand, but also have to ensure the security of the key negotiation. If the key is leaked out, the encrypted information would be equal to a plaintext. At the same time, the same/symmetric key need be generated randomly and uniquely. For example, a key between A and B must be different from a key between A and C, or else, the security of the information sent (or transmitted) to B would get threatened. In such case, $N^2/2$ different keys are required for a group including n communication parties, so that the scale of key is huge.

The other is asymmetric key encryption (also referred to as public key encryption), i.e., every party has a pair of keys which correspond to each other: a public key and a private key, wherein only the public key is kept public. A sender encrypts information to be sent by using a public key of a receiver, and the receiver decrypts the information with its own private key. Although this approach can ensure the security of key, the sender still has to obtain the public key of the receiver beforehand. Also, there exist defects of complex algorithm, low speed of encryption and decryption, and poor efficiency.

For example, a solution in U.S. Pat. No. 7,017,181 (Identity-based-encryption Messaging System with Public Parameter Host Servers) discloses: a server is configured to manage a public key based on identity and corresponding to a unique identifier of a receiver, and a sender encrypts information by using the corresponding public key obtained from the server, thereby the security of the information communication is ensured. To send information to any receiver in this solution, it is required to access some servers in a network, which not only results in high cost for communication insurance, but also requires modification of the existing communication platform.

Apparently, in the prior art, a sender and a receiver have to negotiate before encryption/decryption to ensure the security of communication, while defects of poor security of communication or necessary access to other communication entities also exist. Therefore, there is not an appropriate solution for ensuring the security of information transmission in the prior art.

SUMMARY OF THE INVENTION

Embodiments of the present invention direct to provide technical solutions for implementing encryption and transmission of information to realize a secure communication between a sender and a receiver without negotiation between the sender and the receiver before encryption/decryption and without interaction with any other entities during every encryption/decryption process.

To achieve the above purpose, embodiments of the present invention provide a method for implementing encryption and transmission of information, wherein the following steps are performed when a sender sends information to a receiver:

S1: a client of the sender encrypts the information by using a unique identifier of a receiver identity as a public key;

S2: the sender sends the encrypted information to the receiver;

S3: the receiver receives the encrypted information, and a client of the receiver performs decryption by using a user private key;

wherein the client of the receiver obtains the user private key by one-off registration and the user private key matches with the unique identifier of the receiver identity.

Preferably, before the step S2, the method may further comprise: encoding the encrypted information to make the encoded encrypted information compatible with format of an existing information transmission platform.

Specifically, the step of the client of the receiver obtaining the user private key by one-off registration may comprise: the client of the receiver applies for a registration to a registration server; the registration server performs authentication on the receiver identity, and sends identity information of the client of the receiver which passes the authentication to a private key generation server; the private key generation server generates the user private key according to the unique identifier of the receiver identity, and sends the user private key to the registration server; the registration server returns information of registration success and send the user private key to the client of the receiver.

To ensure the security of the user private key, the step of sending the user private key to the client of the receiver may comprise: encrypting the user private key, and sending the user private key to the client of the receiver. A manner of encrypting the user private key comprises symmetric key encryption and/or asymmetric key encryption.

To ensure the security of local information, the method may further comprise steps of the client of the sender and the client of the receiver performing encryption protection to local information by self-set password.

In the above technical solutions, the number of the receiver may be one or more than one. The sender performs the above steps respectively when sending the information to any receiver.

The receiver may be a mobile terminal, and the unique identifier of the receiver is a mobile terminal number of the receiver or a network communication number of the receiver.

Or, the receiver may be a PC or other device connected to a network in a wired or wireless manner, and the unique identifier of the receiver is a network communication number of the receiver.

The sender may comprise mobile terminal, PC and other device connected to a network in a wired or wireless manner.

The information sent from the sender to the receiver may be SMS message or MMS message.

Embodiments of the present invention further provide a system for implementing encryption and transmission of information. The system comprises an information transmission platform, and a sender and a receiver connected to each other by (or via) the information transmission platform, and further comprises a client provided in the sender, a client provided in the receiver, and a registration component.

The client of the sender is configured to encrypt information by using a unique identifier of a receiver identity as a public key and send the encrypted information to the receiver by the information transmission platform.

The client of the receiver is configured to decrypt the encrypted information by using a user private key after receiving the encrypted information; wherein the client of the receiver obtains the user private key by one-off registration to the registration component and the user private key matches with the unique identifier of the receiver identity.

The client of the sender may comprise an encoding module for encoding the encrypted information to make the encoded encrypted information compatible with format of the existing information transmission platform.

Specifically, the registration component may comprise a registration server and a private key generation server which have communication connections with each other. The registration server is configured to receive a registration application from the client of the receiver, perform authentication on the receiver identity, send the identity information of the client of the receiver which passes the authentication to the private key generation server, deliver the user private key from the private key generation server to the client of the receiver, and return information of registration success to the client of the receiver. The private key generation server is configured to generate the user private key according to the unique identifier of the receiver identity, and send the user private key to the registration server.

To ensure the security of the user private key, a user private key encryption module for encrypting and sending the user private key may be provided in the registration server. The user private key encryption module may encrypt the user private key in a manner of symmetric key encryption and/or asymmetric key encryption.

To ensure the security of local information, a local information encryption module for performing encryption protection to local information by self-set password may be provided respectively in the client of the sender and the client of the receiver.

In the above technical solutions, the number of the receiver is one or more than one.

The receiver may be a mobile terminal, and the unique identifier of the receiver is a mobile terminal number of the receiver or a network communication number of the receiver.

The receiver may be a PC or other device connected to a network in a wired or wireless manner, and the unique identifier of the receiver is a network communication number of the receiver.

The sender may comprise mobile terminal, PC and other device connected to a network in a wired or wireless manner.

The information transmission platform may be a SMS information transmission platform or a MMS information transmission platform.

From the above technical aspects, it can be known that, in the embodiments of the present invention, a unique identifier of a receiver identity is used as a public key, and a client of the receiver obtains a corresponding user private key by means of registration. Thus the technical solutions of the invention can achieve the following effects:

1. The information in the information transmission platform is kept in an encrypted state, so as to prevent the content of the information from being intercepted and being obtained by service providers, realizing the secure communication from the sender to the receiver.

2. Due to taking the unique identifier of the receiver identity as the public key, the sender can obtain the public key without negotiation with the receiver before encryption. Thus, a process of establishing initial key isn't required.

3. The sender obtains the user public key directly, and the receiver can obtain the user private public key by one-off registration. Thus, a negotiation process between the sender and the receiver before encryption/decryption and interaction with any other entities during every encryption/decryption process are avoided.

The above purposes and other purposes, features and advantages will be more apparent from the accompanying drawings and the following detailed description of the preferred embodiments.

DESCRIPTION OF THE PREFERRED EMBODIMENTS

The embodiments of the present invention will be described below in detail. It should be noted that the embodiments described herein are intended to illustrate, but not to limit the present invention.

The conception of the present invention is to provide an end-to-end secure communication by using the encryption technique, without negotiating key between a sender and a receiver beforehand (i.e., a process of establishing initial key is not required), and without exchange (or interaction) between the sender and the receiver and any other entities during every process of information encryption/decryption.

Figure 1:
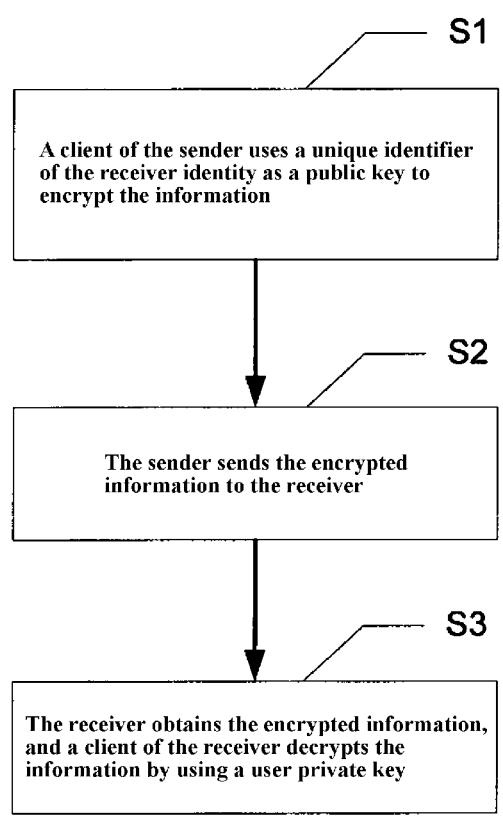
FIG. 1 is a flow chart of a method for implementing encryption and transmission of information according to an embodiment of the present invention.
Figure 2:
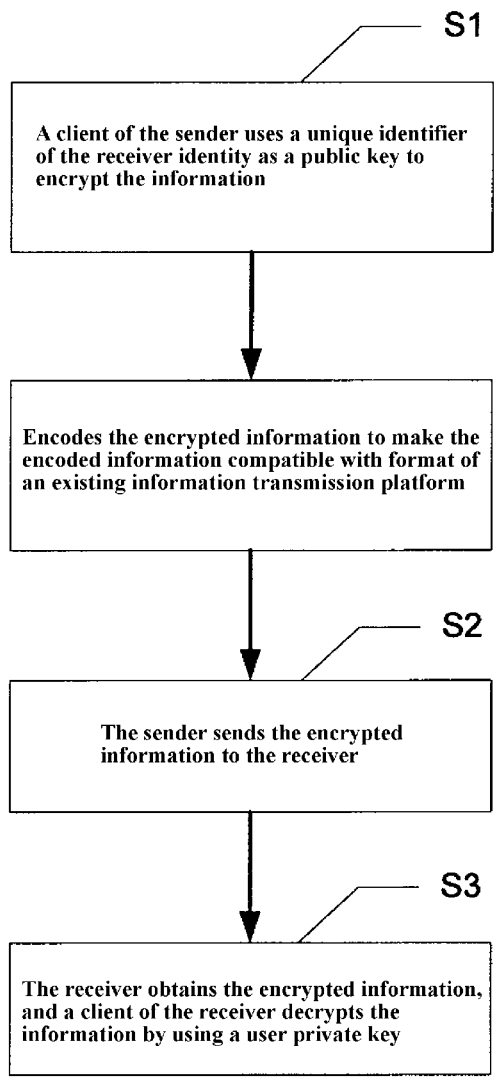
FIG. 2 is a flow chart of a method for implementing encryption and transmission of information according to another embodiment of the present invention.

Specifically, referring to FIGS. 1 and 2 respectively illustrating a flow chart of a method for implementing encryption and transmission of information according to embodiments of the present invention, the information may be SMS message, MMS message, or any other information format used as carrier for transmitting information content.

In the embodiments, when sending information to a receiver, a sender performs the following steps.

S1: A client of the sender uses a unique identifier of the receiver identity as a public key to encrypt the information.

Compared with the solution in the prior art that the sender needs to obtain the public key of the receiver from other communication entities beforehand, in the technical solution of the present invention, the client of the sender sends the encrypted information as long as it obtains the unique identifier of the receiver identity.

It should be pointed out that the receiver may be a mobile terminal, and may also be a PC or other communication device connected to a network in a wired or wireless manner. The unique identifier of the receiver may vary in different cases. For example, if the receiver is a mobile terminal, the unique identifier of the receiver is generally a mobile terminal number of the receiver. Of course, if a network communication client (such as instant message software) is provided on the mobile terminal, the unique identifier may be a corresponding network communication number. If the receiver is a PC or other communication device (such as PDA, etc.) connected to a network in a wired or wireless manner, the unique identifier is generally the network communication number, such as an instant message (QQ, MSN, etc.) number or an email address, and so on.

Whatever device the receiver is, the sender can obtain the unique identifier of the receiver identity (e.g., a mobile terminal number of the receiver) without negotiation, or can obtain the unique identifier of the receiver identity naturally. Therefore, in such case, the requirement for the public key being shared widely can be satisfied, and a process of establishing initial key isn't required. Also, the properties of the unique identifier of the receiver identity (e.g., the mobile terminal number of the receiver) may ensure the unicity of the identifier, thereby avoiding key collision.

Obviously, in the process of encrypting information by using the public key, the solution of encrypting a public key in the prior art may be adopted. For example, a one-off session key used for information encryption is generated and encrypted by using a public key, and the one-off session key encrypted is comprised in the information. Thus, when receiving the information, the receiver can accomplish the decryption of the information by decrypting the one-off session key using a private key.

It can be seen that, once a sender has installed a corresponding client, the sender would send encrypted information to a receiver. It is unnecessary for the sender to perform a registration to or negotiation with other entities (including the receiver) and generate a private key of the sender itself.

It should be pointed out that not only a client running on a mobile terminal can perform the above operations, but also any electronic device (e.g., PC) which is able to send information may be used as a sender to generate and send the encrypted information after being installed a corresponding client. That is to say, the sender may comprise a mobile terminal, a PC, and other communication device connected to a network in a wired or wireless manner. For example, the portable device connected to an Internet-type network can be used as a sender to send SMS message, MMS message and network instant message.

S2: The sender sends the encrypted information to the receiver.

It can be seen that, in the whole information communication platform, all information is in an encrypted state. Because the information is encrypted by using a unique identifier of the receiver identity as a public key, decryption can be performed only by the private key coming to a pair with the public key, so as to avoid the possibility of decryption by eavesdropper, even service provider.

To realize compatibility with the existing information transmission platform, the following steps may be comprised before the step S2: encoding the encrypted information to make the encoded encrypted information compatible with format of the existing information transmission platform.

Accordingly, the end-to-end secure communication between the sender and the receiver can be realized, without change of the existing information platform.

S3: The receiver obtains the encrypted information, and a client of the receiver decrypts the information by using a user private key.

Specifically, the user private key matching with a unique identifier of the receiver identity is obtained by a client of the receiver by means of one-off registration. This means that, once a client of the receiver is registered, the receiver could decrypt all information which is encrypted by using the unique identifier of the receiver identity as the public key.

Because an authentication on the receiver can be performed during the registration process, authentication measure in the prior art may be used to protect the receiver identity, so as to ensure that a user private key is only obtained by a valid receiver. Also, the registration process is one-off, which may occur when the client is initialized, or when the information received need to be decrypted. In any case, after successful one-off registration, the client of the receiver does not need to make any interaction with any communication entity for the decryption of the encrypted information.

Figure 3:
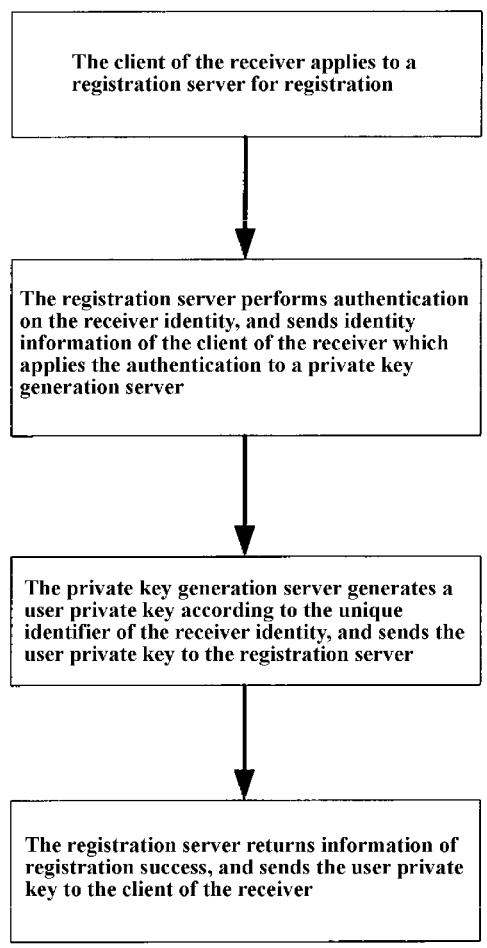
FIG. 3 is a flow chart representing an embodiment in which a client of a receiver obtains user private key by one-off registration in the method shown in FIG. 1 or 2.

Specifically, referring to FIG. 3 illustrating an embodiment in which a client of a receiver obtains a user private key by one-off registration. The embodiment comprises the following steps:

the client of the receiver applies to a registration server for registration; the registration server performs authentication on the receiver identity, and sends identity information of the client of the receiver which passes the authentication to a private key generation server;

the private key generation server generates a user private key according to the unique identifier of the receiver identity, and sends the user private key to the registration server; thus, the user private key and the unique identifier of the receiver identity form a pair of keys; the unique identifier of the receiver identify is shared widely, and the information encrypted by the unique identifier may be decrypted by using the user private key;

the registration server returns information of registration success, and sends the user private key to the client of the receiver. Obviously, the user private key which decrypts the information encrypted by the user public key uniquely can only be obtained by the client of the receiver. Therefore, others cannot decrypt the information even though they have intercepted the encrypted information. Thus, the security of the encrypted information is ensured.

Specifically, a manner of the registration server sending the user private keys may comprise communication delivery, mail delivery, and delivery by hand, etc. The mail delivery and delivery by hand are optional business manner. For example, the user private key may be stored in floppy disk, optical disk or other physical storage device which is mailed or delivered to a user. Or, the user private key may be contained in printed document which is sealed, and the printed document is mailed or delivered to a user, thereafter the user can input the user private key into the client manually.

Of course, the manner of communication delivery is more prompt and direct. However, to enhance the security of a user private key during communication delivery, the step of sending the user private key to the client of the receiver may comprise: encrypting a user private key, and sending the encrypted user private key to the client of the receiver. The manner of the encrypting a user private key may comprise symmetric key encryption and/or asymmetric key encryption.

Specifically, the manner of symmetric key encryption may comprise: a user private key is encrypted using a symmetric key obtained by negotiation with the client of the receiver during registration, then the encrypted user private key is sent, and the client of the receiver decrypts the user private key by using the symmetric key to obtain the user private key.

Or, the manner of asymmetric key encryption may comprise: a user private key is encrypted using a public key of the client of the receiver obtained by registration, then the encrypted user private key is sent, and the client of the receiver decrypts the user private key by using a corresponding private key to obtain the user private key. Because the size of the user private key is small (generally not going beyond 40 bytes), a higher efficiency of the encryption process can be achieved by adopting asymmetric key encryption algorithm. The asymmetric key encryption algorithm may be RSA-OAEP algorithm, ECIES or CS98, etc.

Of course, the manner for encrypting the user private key may be multi-level encryption, i.e., the symmetric key encryption and the asymmetric key encryption are adopted simultaneously in an incorporated (or nesting) manner. Thus, the security of the user private key can be increased without doubt. However, it is generally accompanied by decreased efficiency. Therefore, the manner for encrypting the user private key may be determined according to actual need.

From the above steps S1-S3, it can be seen that the encryption process and the decryption process occur in a device of the sender and a device of the receiver respectively, and the information is kept in an encrypted state in an information transmission platform. Thus, the security of the information from the sender to the receiver is ensured. Only the receiver can obtain the user private key by one-off registration, so that a third party (including service provider in the information transmission platform) cannot decrypt the encrypted information after intercepting it. Also, because the encryption and decryption are performed by using a unique identifier of the receiver identity as a public key, a process of establishing initial key is not required, the sender and the receiver do not need to negotiate key beforehand, and they don't need to make any interaction with any other entity during the encryption/decryption process.

It should be pointed out in particular that a device does not need to register to any entity if it is used as a sender of information, and a device performs registration to obtain a user private key when it is used as a receiver of information if the device is used as a sender and a receiver of information simultaneously (e.g., a mobile terminal).

Preferably, the number of the receiver may be one or more than one, i.e., the sender may encrypt and send one piece of information to a series of receivers. Specifically, the sender performs the above steps respectively when sending the information to each of the receivers.

It should be pointed out that in the case of a plurality of the receivers, the receivers may belong to the same type (for example, all of the receivers are mobile terminals), or the receivers may belong to different types (for example, a part of the receivers are mobile terminals, another part of the receivers are PCs).

Preferably, the method for implementing encryption and transmission of information provided in the present invention further supports secure storage of information in a terminal device, i.e., a client of a sender and a client of a receiver may perform encryption protection for local information by self-set password. Thus, even though a device is attacked or infected by malicious software, the security of the information is ensured.

Some pieces of anti-virus software in the art, specializing in providing security protection for mobile terminal, can only monitor and remove the malicious software stealthily installed in the mobile terminal, so that it is difficult for the software to protect the sent information from being decrypted. Compared with the software, the solution provided in the present invention can protect the information by a self-set password of the sender after the information is edited in the sender, protect the information by a public key of the receiver after the information is sent, and also protect the information by a self-set password of the receiver after the information is received by the receiver. Thus, the information is protected during the whole process, which can prevent the information from being attacked and intercepted at any stage.

The above secure storage measures of information may be realized by the symmetric key encryption technology in the prior art and are not described in more detail here.

Figure 4:
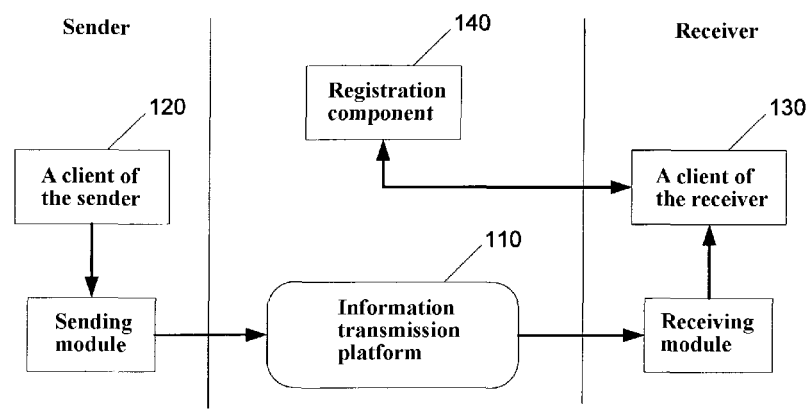
FIG. 4 is a block diagram of a system for implementing encryption and transmission of information according to an embodiment of the present invention.

Correspondingly, a system 100 for implementing encryption and transmission of information is further provided in the present invention. Referring to FIG. 4 illustrating a block diagram of an embodiment, the system 100 comprises an information transmission platform 110, and a sender and a receiver connected to each other by the information transmission platform 110. The system 110 further comprises a client 120 provided in the sender, a client 130 provided in the receiver, and a registration component 140.

It should be pointed out that if a device can be used as both a sender and a receiver, only one client may be provided in the device. The client integrates (combines) all functions as a client of a sender and a client of a receiver. That is to say, in practical application, the following three types of client may be provided for user to select in accordance with requirement: a client only with the function of a client of a receiver, a client only with the function of a client of a sender, and a client with the function of both a client of a sender and a client of a receiver. Of course, in general, the latter two types of client have more applications. In the specification, for convenience of description, the client 120 of the sender and the client 130 of the receiver are described respectively.

Specifically, the sender and the receiver communicate with each other via (by) the information transmission platform 110. The information transmission platform 110 may be a SMS information transmission platform, a MMS information transmission platform, or any other platform which can provide other type of information transmission.

The sender comprises a mobile terminal, a PC, and other communication device connected to a network in a wired or wireless manner which comprises a specific sending module for sending information.

The receiver comprises a mobile terminal, a PC, and other communication device connected to a network in a wired or wireless manner which comprises a specific receiving module for receiving information.

The client 120 of the sender is configured to encrypt the information using a unique identifier of the receiver identity as a public key and send the encrypted information to the receiver via the information transmission platform 110. In the case of the sender being a mobile terminal, a unique identifier of the receiver may be a mobile terminal number of the receiver or a network communication number of the receiver. In the case of the sender being a PC or other communication device connected to a network in a wired or wireless manner, a unique identifier of the receiver may be the network communication number of the receiver.

The client 130 of the receiver is configured to decrypt the encrypted information which is received by the client of the receiver using a user private key, wherein the client 130 of the receiver obtains the user private key by one-off registration to the registration component 140, and the user private key matches with the unique identifier of the receiver identity.

A specific manner of the client 130 of the receiver obtaining the user private key from the registration component 140 may comprise that the client 130 of the receiver makes a communication connection with the registration component 140 and obtains the user private key in a manner of communication delivery, as shown in FIG. 4. Of course, in business application, the client 130 of the receiver may not be connected with the registration component 140, and the user of the client of the receiver may make a registration in the counter, and manually input the user private key.

From the above provided system 100, it can be known that the client 120 of the sender performs encryption and the client 130 of the receiver performs decryption, i.e., the encryption and the decryption occur in a device of the sender and a device of the receiver respectively, and the information is being kept in an encrypted state in the information transmission platform 110. Thus, the security of the information from the sender to the receiver is ensured. Therefore, a third party (including service providers in the information transmission platform) cannot decrypt the encrypted information after intercepting it.

Moreover, the encryption and the decryption in the system 100 are performed by using a unique identifier of the receiver identity as a public key. Therefore, a process of establishing initial key isn't required, and the sender and the receiver do not need to negotiate key beforehand.

And, the client 130 of the receiver obtains the user private key only for one time after or before receiving the encrypted information. Once the registration succeeds, it is not required for the client 130 of the receiver to interact with any other entity during the subsequent process of encryption/decryption.

Figure 5:
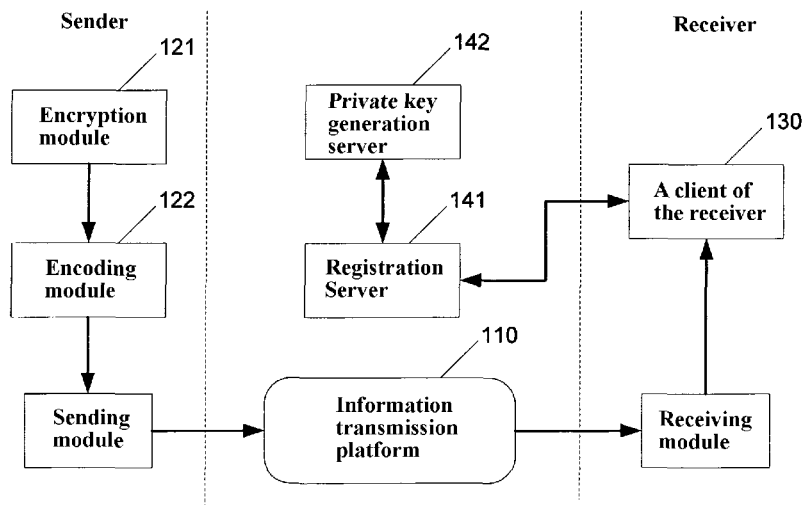
FIG. 5 is a block diagram of a system for implementing encryption and transmission of information according to another embodiment of the present invention.

Referring to FIG. 5, a preferred embodiment of the system 100 for implementing encryption and transmission of information is further provided in the present invention. Based on the embodiment shown in FIG. 4, the client 120 of the sender specifically comprises an encryption module 121 and an encoding module 122 for encoding the encrypted information to make the encoded encrypted information compatible with format of the existing information transmission platform 110. Thus, the transmission of the encrypted information can be realized without change of the existing information transmission platform.

And, the registration component 140 may comprise a registration server 141 and a private key generation server 142 which have communication connections with each other.

The registration server 141 is configured to receive a registration application from the client of the receiver, perform an authentication on the receiver identity, send the identity information of the client of the receiver which passes the authentication to the private key generation server 142, deliver the user private key from the private key generation server 142 to the client 130 of the receiver, and return information of registration success to the client 130 of the receiver. It may be seen that, only a valid client 130 of the receiver can obtain a user private key. Therefore, even though others intercept the encrypted information, they cannot decrypt the information, so that the security of the encrypted information is ensured.

The private key generation server 142 is configured to generate a user private key according to a unique identifier of the receiver identity, and send the user private key to the registration server 141. In general, core software for computing a user private key corresponding to a unique identifier of the receiver identity is provided in the private key generator 142.

The person skilled in the art may understand that the function of the registration server 141 and the private key generation server 142 may be integrally combined in a server, which does not influence the implementation of the present invention.

It should be pointed out that a manner of the registration server 141 sending the user private keys may comprise communication delivery, mail delivery, and delivery by hand, etc. The mail delivery and delivery by hand are optional business manner. For example, a user private key may be stored in floppy disk, optical disk or other physical storage device which is mailed or delivered to a user. Or, a user private key may be sealed in printed document which is mailed or delivered to a user, and manually input to the client by the user.

If a manner of communication delivery is adopted, a user private key encryption module (not shown in the figures) for encrypting a user private key and subsequently sending it may be provided in the registration server 141 to ensure the security of the user private key. The user private key encryption module may perform encryption by means of symmetric key encryption and/or asymmetric key encryption.

Preferably, to realize protection for the information in the whole process, a local information encryption module 121 and a local information encryption module 131 for performing encryption protection for local information by self-set password may be provided in the client 120 of the sender and the client 130 of the receiver respectively.

The above-mentioned embodiment in FIG. 4 or FIG. 5 takes one sender and one receiver as example. However, the person skilled in the art may understand that the number of the receiver may be one or more than one. For example, in the case that the receivers area plurality of mobile terminals, the sender encrypts and sends information respectively according to a unique identifier of each of the receivers identity, so as to realize mass sending/multicasting of the encrypted information to a plurality of receivers. Of course, the receivers may belong to the same type, for example, all of the receivers may be mobile terminals; or, the receivers also may belong to different types, for example, a part of the receivers are mobile terminals, another part of the receivers are PCs.

The method and system for implementing encryption and transmission of information provided in the present invention may be applied to, but not limited to, the following situations:

Service providers providing software or solutions of information mass sending (or multicasting) for organizations, enterprises, etc., may adopt the technical solution provided in the present invention to ensure the security of the information based on the existing information transmission platform.

Mobile service providers may adopt the technical solution provided in the present invention to ensure the security of information communication.

Distributors, dealers and retailers of smart phone may support the technical solution of the present invention by integrating corresponding client in smart phone.

Banking and financial organizations may adopt the technical solution of the present invention to protect private and sensitive information. Typical private information comprises authorization information, account statement, and account information, etc.

Although the present invention has been described with reference to several embodiments, it should be understood that the terms herein is to illustrate rather than limit the present invention. The present invention can be implemented in many particular embodiments without departing from the spirit and scope of the present invention, thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. A method for implementing encryption and transmission of information, characterized in that the following steps are performed when a sender sends information to a receiver:
   allowing a client of the sender to encrypt the information by using only a unique identifier of a receiver identity itself as a public key, the information sent from the sender to the receiver being SMS information or MMS information;
   allowing the sender to send the encrypted information to the receiver; and
   allowing the receiver to receive the encrypted information, and allowing a client of the receiver to perform decryption by using a user private key;
   wherein the client of the receiver is allowed to obtain the user private key by one-off registration, and the user private key matches with the unique identifier of the receiver identity;
   the step of allowing the client of the receiver to obtain the user private key by one-off registration comprises:
   allowing the client of the receiver to apply for a registration to a registration server using said unique identifier of a receiver identity;
   using the registration server to perform authentication on said unique identifier of the receiver identity, and to send said unique identifier of the receiver identity of the receiver which passes the authentication to a private key generation server;
   using the private key generation server to generate the user private key according to the unique identifier of the receiver identity, to form a pair of keys consisting of the user private key and the unique identifier of the receiver identity, and to send the user private key to the registration server;
   using the registration server to return information of registration success to the client of the receiver, and to send the user private key to the client of the receiver;
   wherein the receiver is a mobile terminal, and the unique identifier of the receiver is a mobile terminal number of the receiver or a network communication number of the receiver, or
   the receiver is a PC or other device connected to a network in a wired or wireless manner, and the unique identifier of the receiver is a network communication number of the receiver;
   there is no need of negotiating with other communication entities comprising a management server to obtain a public key.

2. The method for implementing encryption and transmission of information according to claim 1, characterized by before allowing the sender to send the encrypted information to the receiver, further comprising: allowing the sender to encode the encrypted information to make the encoded encrypted information compatible with format of an existing information transmission platform.

3. The method for implementing encryption and transmission of information according to claim 1, characterized in that the step of sending the user private key to the client of the receiver comprises:
   encrypting the user private key, and then sending the encrypted user private key to the client of the receiver, wherein a manner of the encrypting the user private key comprises symmetric key encryption, asymmetric key encryption, or a combination thereof.

4. The method for implementing encryption and transmission of information according to claim 1, characterized by further comprising:
   allowing the client of the sender and the client of the receiver to perform encryption protection to local information by self-set password.

5. The method for implementing encryption and transmission of information according to claim 1, characterized in that the number of the receiver is one or more than one, and the sender is allowed to perform the above steps respectively when sending the information to any receiver.

6. The method for implementing encryption and transmission of information according to claim 1, characterized in that the sender comprises one or combination of a mobile terminal, a PC and other device connected to a network in a wired or wireless manner.

7. A system for implementing encryption and transmission of information, comprising an information transmission platform connecting a sender and a receiver to each other; characterized by further comprising a client provided in the sender, a client provided in the receiver, and a registration component;
   the client of the sender for encrypting information by using only a unique identifier of a receiver identity itself as a public key, the information being SMS info on or MMS information, and sending the encrypted information to the receiver by the information transmission platform; and
   the client of the receiver for decrypting the encrypted information which is received by the client of the receiver by using a user private key;
   wherein the client of the receiver is allowed to obtain the user private key by one-off registration to the registration component, the user private key matches with the unique identifier of the receiver identity;
   the registration component comprises a registration server and a private key generation server which have communication connections with each other;
   the registration server for receiving a registration application from the client of the receiver using said unique identifier of a receiver identity, performing authentication on said unique identifier of the receiver identity, sending said unique identifier of the receiver identity of the receiver which passes the authentication to the private key generation server, delivering the user private key from the private key generation server to the client of the receiver, and returning information of registration success to the client of the receiver; and the private key generation server for generating the user private key according to the unique identifier of the receiver identity, forming a pair of keys consisting of the user private key and the unique identifier of the receiver identity, and sending the user private key to the registration server;

the information transmission platform being a SMS information transmission platform or a MMS information transmission platform;

wherein the receiver is a mobile terminal, and the unique identifier of the receiver is a mobile terminal number of the receiver or a network communication number of the receiver, or the receiver is a PC or other device connected to a network in a wired or wireless manner, and the unique identifier of the receiver is a network communication number of the receiver;

there is no need of negotiating with other communication entities comprising a management server to obtain a public key.

8. The system for implementing encryption and transmission of information according to claim 7, characterized in that the client of the sender comprises an encoding module for encoding the encrypted information to make the encoded encrypted information compatible with format of an existing information transmission platform.

9. The system for implementing encryption and transmission of information according to claim 7, characterized in that a user private key encryption module for encrypting the user private key and sending the user private key is provided in the registration server; and a manner of the encrypting the user private key by the user private key encryption module comprises symmetric key encryption, asymmetric key encryption, or a combination thereof.

10. The system for implementing encryption and transmission of information according to claim 7, characterized in that the client of the sender and the client of the receiver are provided with a local information encryption module for performing encryption protection to local information by self-set password respectively.

11. The system for implementing encryption and transmission of information according to claim 7, characterized in that the number of the receiver is one or more than one.

12. The system for implementing encryption and transmission of information according to claim 7, characterized in that the sender comprises one or combination of a mobile terminal, a PC and other device connected to a network in a wired or wireless manner.

* * * * *